US008424109B2

(12) United States Patent
Kakehi et al.

(10) Patent No.: US 8,424,109 B2
(45) Date of Patent: Apr. 16, 2013

(54) INFORMATION PROCESSING APPARATUS, AND COMPUTER READABLE MEDIUM

(75) Inventors: Rumiko Kakehi, Minato-ku (JP); Toshikatsu Suzuki, Zama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 516 days.

(21) Appl. No.: 12/617,484

(22) Filed: Nov. 12, 2009

(65) Prior Publication Data

US 2010/0325688 A1    Dec. 23, 2010

(30) Foreign Application Priority Data

Jun. 19, 2009  (JP) ................................. 2009-145975

(51) Int. Cl.
    *G06F 7/04*    (2006.01)
(52) U.S. Cl.
    USPC ........................................................... 726/31
(58) Field of Classification Search ...................... 726/31
    See application file for complete search history.

(56) References Cited

U.S. PATENT DOCUMENTS

| 5,583,941 A | 12/1996 | Yoshida |
| 7,978,350 B2 * | 7/2011 | Ko .............................. 358/1.13 |
| 2007/0174896 A1 | 7/2007 | Furuya |

FOREIGN PATENT DOCUMENTS

| JP | 3493522 A | 11/2003 |
| JP | 2007-199909 A | 8/2007 |

* cited by examiner

*Primary Examiner* — Christopher Brown
(74) *Attorney, Agent, or Firm* — Sughrue Mion, PLLC

(57) ABSTRACT

An information processing apparatus, includes: a registering unit for referring to a first storing unit for storing usage limitation information indicating a policy of usage limitation of a document which corresponds to a pair of a stamp image corresponding to an image representing that the document is limited in use, and the number of the stamp images, extracting the stamp image from document image information obtained by reading a paper document containing at least one of the stamp images, obtaining the usage limitation information corresponding to a pair of the extracted stamp image and the number of the extracted stamp images from the first storing unit, and registering the obtained usage limitation information and the document containing the document image information in correlation with each other into a second storing unit.

11 Claims, 8 Drawing Sheets

FIG.3

| POLICY ID | SECURITY LEVEL | USAGE RANGE | PERMITTED OPERATION | USAGE TERM |
|---|---|---|---|---|
| policy1 | FOR INTERNAL USE ONLY | DIVISION A | INSPECTION/ EDIT | INDEFINITE |
| | | INTERNAL | INSPECTION | |
| policy2 | FOR DIVISION USE ONLY | GROUP D | INSPECTION/ EDIT | INDEFINITE |
| | | DIVISION A | INSPECTION | |
| policy3 | FOR GROUP USE ONLY | PREPARER | INSPECTION/ EDIT | ONE YEAR |
| | | GROUP D | INSPECTION | |
| ... | ... | ... | ... | ... |

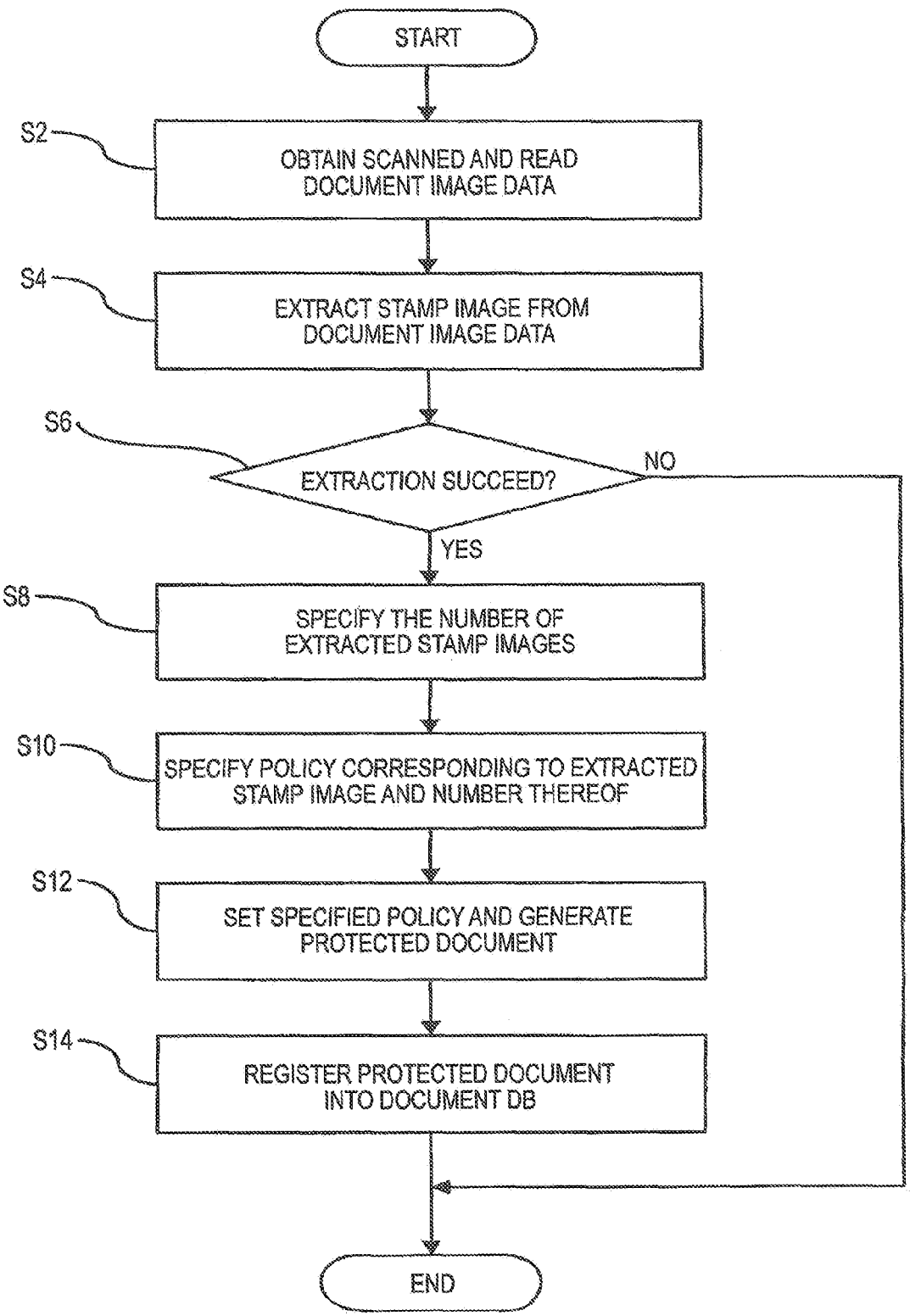

FIG.7

| POLICY ID | STAMP ID | USAGE TERM | USAGE RANGE | PERMITTED OPERATION |
|---|---|---|---|---|
| policy1 | stamp1 | ONE YEAR | REFER TO STAMP TABLE | REFER TO STAMP TABLE |
| policy2 | stamp2 | ONE YEAR | | |
| policy3 | stamp3 | INDEFINITE | | |
| policy4 | stamp4 | INDEFINITE | | |
| ... | ... | ... | ... | ... |

FIG.8

| STAMP IMAGE | NUMBER OF STAMPS | STAMP ID | USAGE RANGE | PERMITTED OPERATION |
|---|---|---|---|---|
| IMPORTANT | 1 | stamp1 | DIVISION A | INSPECTION/EDIT/PRINT |
| | 2 | stamp2 | GROUP D | INSPECTION/EDIT |
| | | | DIVISION A | INSPECTION/PRINT |
| CONFIDENTIAL | 1 | stamp3 | PREPARER | INSPECTION/EDIT |
| | | | GROUP D | INSPECTION/PRINT |
| | 2 | stamp4 | GROUP D | INSPECTION |
| ... | ... | ... | ... | ... |

FIG.9A
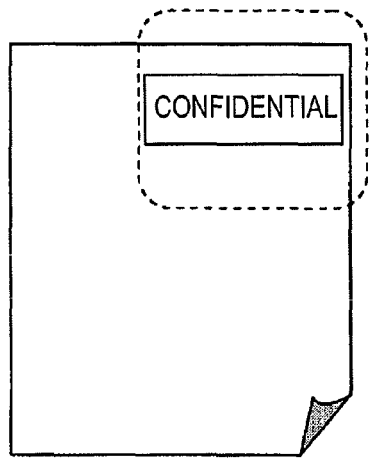
FIG.9B
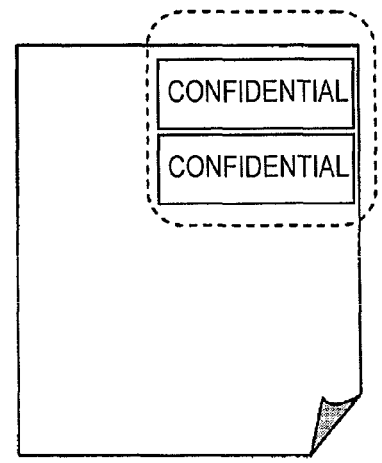
FIG.10
| POLICY ID | STAMP ID | USAGE RANGE | PERMITTED OPERATION | USAGE TERM |
|---|---|---|---|---|
| policy1 | stamp1 | DIVISION A | INSPECTION/ EDIT | REFER TO STAMP TABLE |
| policy2 | stamp2 | DIVISION A | INSPECTION/ EDIT | |
| policy3 | stamp3 | PREPARER | INSPECTION/ EDIT | |
| | | GROUP D | INSPECTION/ PRINT | |
| policy4 | stamp4 | PREPARER | INSPECTION/ EDIT | |
| | | GROUP D | INSPECTION/ PRINT | |
| ... | ... | ... | ... | ... |

| STAMP IMAGE | NUMBER OF STAMPS | STAMP ID | USAGE TERM |
|---|---|---|---|
| IMPORTANT | 1 | stamp1 | INDEFINITE |
| IMPORTANT | 2 | stamp2 | THREE YEARS |
| CONFIDENTIAL | 1 | stamp3 | ONE YEAR |
| CONFIDENTIAL | 2 | stamp4 | SIX MONTHS |
| ... | ... | ... | ... |

INFORMATION PROCESSING APPARATUS, AND COMPUTER READABLE MEDIUM

CROSS-REFERENCE TO RELATED APPLICATIONS

This application is based on and claims priority under 35 USC 119 from Japanese Patent Application No. 2009-145975 filed Jun. 19, 2009.

BACKGROUND

1. Technical Field

The present invention relates to an information processing apparatus, and a computer readable medium.

2. Related Art

There is known a technique in which usage of a document is limited in accordance with a security policy (hereinafter referred to as simply "policy") representing a policy of limitation in use of documents, thereby preventing unjust use of the document. In such a technique, a policy is set to each of documents as use-limiting targets, and usage of each document is limited in accordance with the policy set to the document concerned. The policy set to a document indicates, for example, the type of an operation which is permitted or prohibited to a user or a user group, an effective term for which the document can be used, and the like.

SUMMARY

According to an aspect of the present invention, there is provided an information processing apparatus, including: a registering unit for referring to a first storing unit for storing usage limitation information indicating a policy of usage limitation of a document which corresponds to a pair of a stamp image corresponding to an image representing that the document concerned is limited in use, and the number of the stamp images, extracting the stamp image from document image information obtained by reading a paper document containing at least one of the stamp images, obtaining the usage limitation information corresponding to a pair of the extracted stamp image and the number of the extracted stamp images from the first storing unit, and registering the obtained usage limitation information and the document containing the document image information in correlation with each other into a second storing unit.

BRIEF DESCRIPTION OF THE DRAWINGS

Exemplary embodiments of the present invention will be described in detail based on the following figures, wherein:

FIG. 3 shows an example of contents of a policy table;

FIG. 6 is a flowchart showing an example of the procedure in processing executed when the policy server generates a protected document;

FIG. 7 shows another example of contents of the policy table;

FIG. 8 shows another example of contents of the stamp table;

FIGS. 9A and 9B are diagrams showing another example of the paper document on which a stamp is applied;

FIG. 10 shows a further example of contents of the policy table;

DETAILED DESCRIPTION

Exemplary embodiments according to the present invention will be described hereunder with reference to the accompanying drawings.

Figure 1:
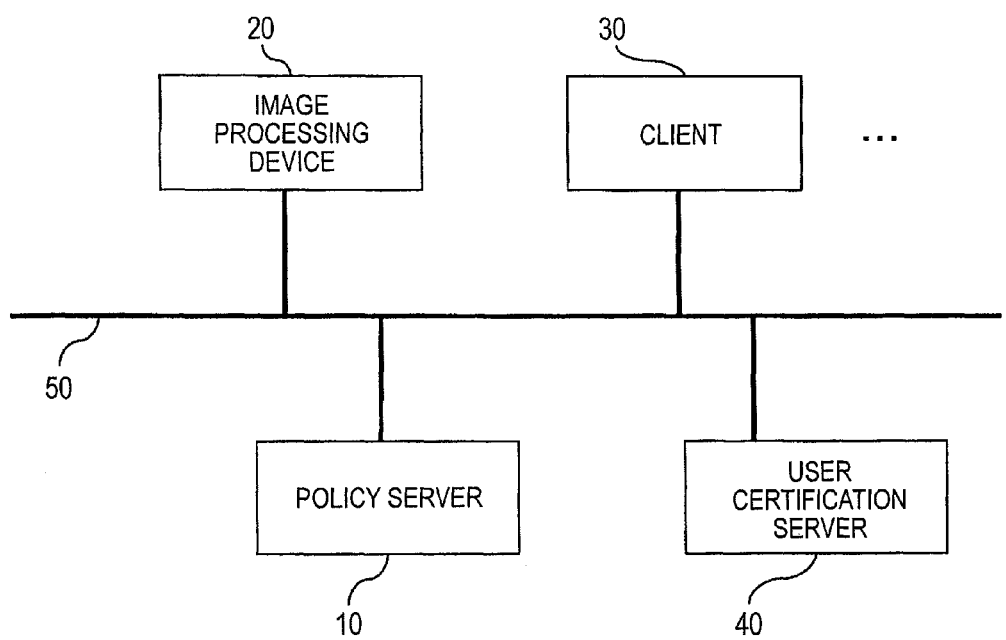
FIG. 1 is a block diagram showing an example of the construction of a system for managing usage of documents.

FIG. 1 shows an example of the schematic construction of a system which manages usage of documents. The system exemplified in FIG. 1 includes a policy server 10, an image processing device 20, a client 30, and a user certification server 40, which are connected to one another through a network 50.

The policy server 10 manages a policy appended to a document. The policy server 10 also limits usage of a policy-appended document (hereinafter referred to as "protected document") in accordance with the policy concerned. Details of the policy server 10 will be described later.

The image processing device 20 has a scanning function which scans a paper document to generate document image data. The image processing device 20 transmits the generated document image data to the policy server 10. The image processing device 20 may have at least one of a printing function of printing an electronic document on a medium such as paper, a copying function of making a copy of a paper document, and a faxing function of transmitting/receiving a FAX (facsimile), in addition to the scanning function.

The client 30 is a terminal device which executes an operation on an electronic document in accordance with a user's instruction. The client 30 executes operations such as new preparation, inspection, edition, print and deletion of electronic documents, for example. When an instruction of executing an operation on a protected document is received from a user, the client 30 inquires to the policy server 10 about whether the operation concerned can be executed or not. The client 30 executes the operation only when permission of the execution concerned is notified from the policy server 10.

The user certification server 40 manages certification information for users who are registered in advance as users of the system, and performs user certification. The user's identification information (user ID or the like) and certification information (password or the like) which are input in the image processing device 20 or the client 30 are received from the image processing device 20 or the client 30 through the network 50 by the user certification server 40. Then, the user certification server 40 performs the user certification, and returns the certification result. The user certification server 40 manages information for correlating a user group with users belonging to the group. The user certification server 40 sometimes transmits the information regarding the users and the user group to the policy server 10 in accordance with a request from the policy server 10.

FIG. 1 shows one image processing device 20 and one client 30. However, the system may include a plurality of the image processing devices 20 and the clients 30.

Figure 2:
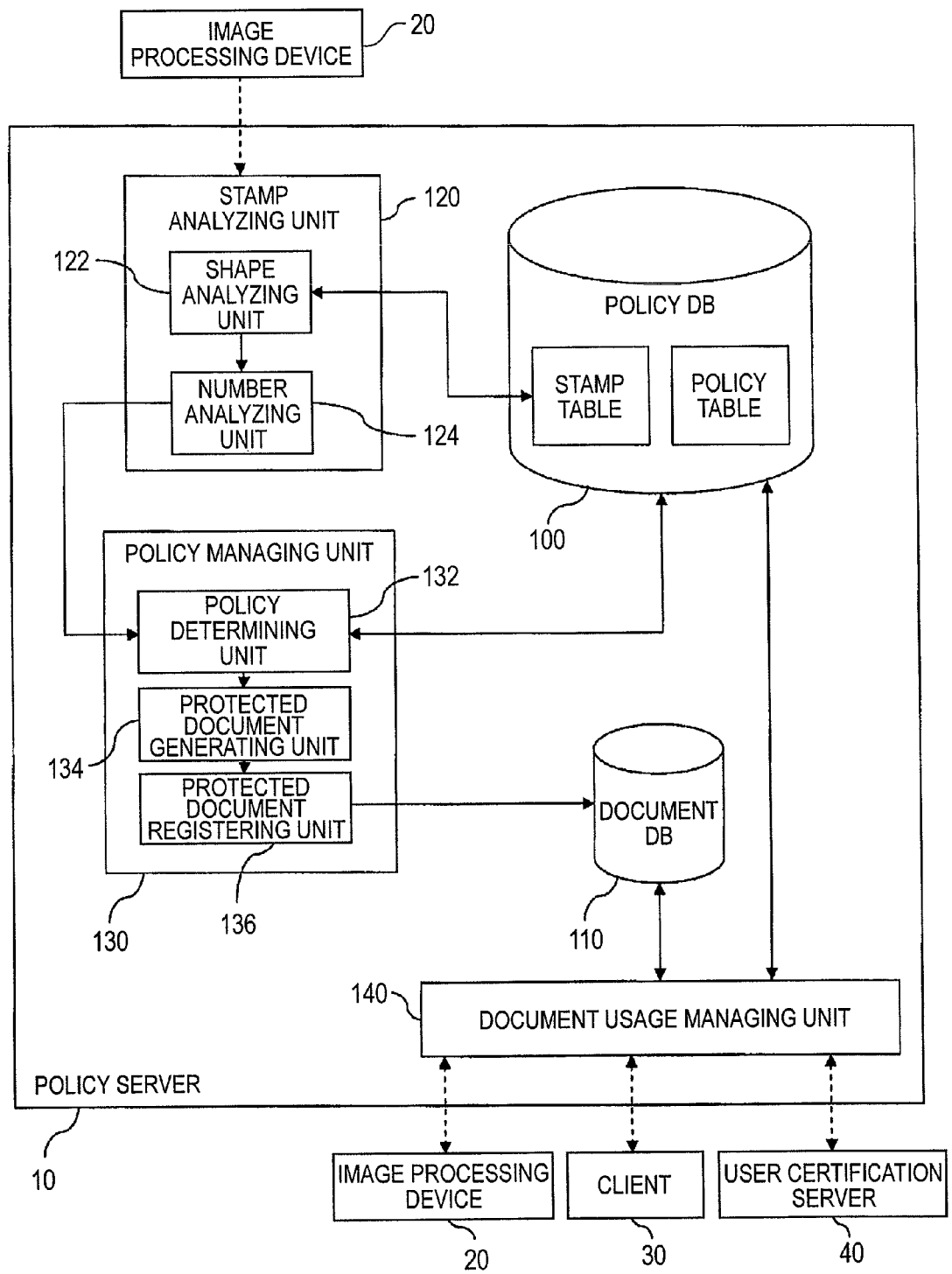
FIG. 2 is a block diagram showing a schematic example of the internal construction of a policy server.

An example of the schematic internal construction of the policy server 10 will be described with reference to FIG. 2. The policy server 10 is provided with a policy DB (database) 100, a document DB 110, a stamp analyzing unit 120, a policy managing unit 130, and a document usage managing unit 140.

The policy DB 100 is a database that stores information regarding policies. The policy DB 100 stores a policy table and a stamp table.

FIG. 3 shows an example of contents of the policy table. A policy ID, a security level, a usage range, a permitted operation, and a usage term are registered in association with one another with respect to each policy in the policy table shown in FIG. 3. The policy ID is unique identification information provided to each policy in the system. The security level is the information indicating the confidentiality level of a document to which a policy is appended, and it is set by a user or an administrator of the system. The usage range indicates a subject(s) to execute the operation on a document, and it is represented by identification information (user ID, name of user's division, and the like) of a user or a group, or a user's role ("preparer" of a document, for example) in relation to a document. The permitted operation indicates the type of an operation which is permitted to a user or a group represented by the corresponding usage range. The usage term indicates a term for which the user or the group represented by the corresponding usage range can use the document. In the items described above, the values of the usage range, the permitted operation and the usage term define the content of the policy.

Figure 4:
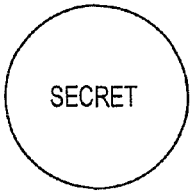
FIG. 4 shows an example of contents of a stamp table.

FIG. 4 shows an example of the content of the stamp table stored in the policy DB 100. In the system of the example, a paper document is sealed with a stamp (seal) for example, whereby a mark indicating that the system conducts the usage limitation to the document concerned is appended to the document. When the policy server 10 obtains document image data generated by scanning a mark-appended paper document in the image processing device 20, the policy based on the number of marks contained in the document image data is set to an electronic document containing the document image data. The information regarding the mark as described above is registered in the stamp table of the policy DB 100.

The values of the respective items of the stamp image, the number of stamps and the security level are registered in association with one another in the stamp table of FIG. 4. The image of the mark as described above is registered in the item of the stamp image. Image data obtained by beforehand scanning a paper sheet to which the corresponding stamp is affixed is used as a stamp image, for example. In this example, the stamp image indicates the shape of the corresponding stamp. The number of stamps indicates the number of the corresponding stamp images contained in one paper document (the frequency of affixing the corresponding stamps onto one paper document). The security level indicates the security level of a policy which is to be appended to an electronic document containing document image data of a paper document having an stamp image of corresponding "number of stamps". The security level in the stamp table exemplified in FIG. 4 corresponds to the security level in the policy table shown in FIG. 3.

Figure 5A:
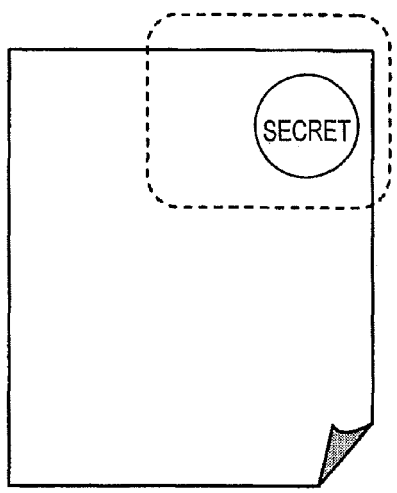
FIG. 5 shows an example of a paper document on which a stamp is applied.

The relationship between the content of the stamp table and the policy appended to the document is as follows, for example. A policy of the security level "FOR INTERNAL USE ONLY" (the policy of policy ID "policy1" in FIG. 3) on a row where the number of stamps is "1" in the table in FIG. 4 is appended to the electronic document containing document image data of a paper document (see FIG. 5A) which has only one stamp image (including the characters "SECRET") in the stamp table in FIG. 4. Furthermore, a policy of the security level of "FOR DIVISION USE ONLY" (the policy of policy ID "policy2" in FIG. 3) on a row where the number of stamps is "2" in the table in FIG. 4 is appended to the electronic document corresponding to a paper document (FIG. 5B) including two stamp images as shown in FIG. 4.

According to the system of this example, a policy for limiting usage of a protected document more strictly as the number of stamps is larger is appended to an electronic document which corresponds to a paper document. Here, to limit the usage of the protected document "more strictly" means to lower the number of users in the usage range corresponding to the same permitted operation with respect to the usage range, and to lower the number of permitted operations corresponding to the users in the same usage range with respect to the permitted operation. With respect to the usage term, the usage is assumed to be limited more strictly as the term is shorter. In this example, a policy which is correlated with a larger number of stamps contains more strict usage limitation with reference to at least one of the usage range, the permitted operation, and the usage term.

Here, the policy of "policy1" whose security level is "FOR INTERNAL USE ONLY" corresponding to the number of stamps "1", is compared with the policy of "policy2" whose security level is "FOR DIVISION USE ONLY" corresponding to the number of stamps "2" with reference to FIGS. 3 and 4, for example. Here, the number of users belonging to each user group of "Division A", "Internal", and "Group D" in the usage range is assumed to successively decrease in order of "Internal", "Division A", and "Group D". In the polices "policy1" and "policy2", it is apparent that the number of users in the usage range corresponding to the same permitted operation of "Inspection/Edit" (users in "Division A" and "Group D") is smaller in the policy of "policy2", and the number of users in the usage range corresponding to the same permitted operation "Inspection" (users in "Internal" and "Division A") is also less in the policy of "policy2". The policies of "policy1" and "policy2" are both "Indefinite" in the usage term. Furthermore, the policy of "policy2" is compared with the policy of "policy3" whose security level is "FOR GROUP USE ONLY" corresponding to the number of stamps "3". In this case, the number of users as "Preparer (one user as a preparer of a protected document)" in the policy of "policy3" is smaller than "Group D" in the policy of "policy2" in the usage range corresponding to the permitted operation of "Inspection/Edit". The number of users in "Group D" in the policy of "policy3" is smaller than "Division A" in the policy of "policy2" in the usage range corresponding to the permitted operation of "Inspection". The usage term of "one year" in the policy of "policy3" is shorter than the period of "indefinite" in the policy of "policy2".

If users are beforehand informed of the fact that the usage limitation of a protected document is more strict as it has a larger number of stamp images, a user who watches the paper document affixed with the stamp recognizes that the usage of the document is limited more strictly as the number of affixed stamps is larger.

Returning to FIG. 2, the document DB 110 is a database in which protected documents are stored. The protected document includes document identification information, the policy ID of an affixed policy and the content data of the document concerned.

The content data may be encrypted. The document DB 110 may store a table containing policy IDs and attribution information of protected documents (preparer, preparation date and time, and storage locations of the protected documents in the document DB 110) in association with the identification information of the protected documents.

The stamp analyzing unit 120 analyzes the document image data received from the image processing device 20, and determines whether the stamp image registered to the stamp table in the policy DB 100 is contained in the document image data. When the stamp image is contained in the document image data, the number of stamp images in the document image data is specified. The stamp analyzing unit 120 is provided with a shape analyzing unit 122 and a number analyzing unit 124. The shape analyzing unit 122 extracts the stamp image registered in the stamp table from the document image data. When the stamp image is extracted from the document image data in the shape analyzing unit 122, the number analyzing unit 124 specifies the number of extracted stamp images.

The policy managing unit 130 sets a policy to an electronic document containing document image data which is processed in the stamp analyzing unit 120. The policy managing unit 130 is provided with a policy determining unit 132, a protected document generating unit 134, and a protected document registering unit 136. The policy determining unit 132 obtains the number of stamp images contained in the document image data as a processing target from the number analyzing unit 124 in the stamp analyzing unit 120, and then refers to the stamp table and the policy table of the policy DB 100 to thereby obtain the policy ID of the policy corresponding to the number of the stamp images. The protected document generating unit 134 generates an electronic document containing document image data corresponding to a processing target as a protected document to which the policy of the policy ID obtained by the policy determining unit 132 is set. The protected document registering unit 136 registers the protected document generated by the protected document generating unit 134 into the document DB 110.

The document usage managing unit 140 limits the usage of the protected document. The document usage managing unit 140 generates information indicating whether the document can be used or not in response to a request for using the protected document from the image processing device 20 or the client 30.

The usage of the protected document in the image processing device 20 means scanning or copying of the protected document which is printed as a paper document. The usage of the protected document in the client 30 means, for example, execution of an operation such as inspection, editing, or printing on the protected document as an electronic document. The usage request of the protected document includes, for example, identification information of the protected document, the user ID of a user requesting the usage, and information indicating the type of the requested operation. When a usage request is received from the image processing device 20 or the client 30, the document usage managing unit 140 obtains from the document DB 110 the policy ID corresponding to the identification information of the protected document contained in the usage request, and obtains the content of the policy of the obtained policy ID from the policy table in the policy DB 100, for example. Thus, whether the protected document can be used or not is determined in accordance with the content of the obtained policy. Here, the document usage managing unit 140 may access the user certifying server 40 to obtain a user belonging to a user group presented in the usage range of the policy, if necessary. When it is determined whether the protected document can be used or not, the document usage managing unit 140 returns the result to the image processing device 20 or the client 30 of a request source (requester).

The procedure of the processing to generate a protected document of document image data obtained from the image processing device 20 in the policy server 10 will be described with reference to FIG. 6.

The image processing device 20 scans a paper document to generate document image data, and then transmits the generated document image data to the policy server 10. When the policy server 10 receives the document image data from the image processing device 20, the policy server 10 starts the processing of the procedure in FIG. 6.

The stamp analyzing unit 120 of the policy server 10 first obtains the document image data transmitted from the image processing device 20 (step S2).

The shape analyzing unit 122 of the stamp analyzing unit 120 refers to the stamp table of the policy DB 100 and extracts a stamp image from the document image data (step S4). In the step S4, the stamp image as a target image is extracted from the document image data by using, for example, a conventional technique in which a preset target image is extracted from image data. For example, the processing of extracting the feature amount of the image data from an area corresponding to the size of the stamp image registered in the stamp table out of the whole area of the document image data and determining the similarity between the extracted feature amount and the feature amount of the stamp image is repeated while the position of the above area of the document image data descried above is displaced. At the time point when the area in which the similarity is equal to or more than a preset threshold value is discovered in the document image data, the area is extracted as a stamp image in the document image data. An area to which a stamp is affixed may be preset on a paper document. A place at which no document content is printed is set as an area to which a stamp is affixed, for example. When a user affixes a stamp on a paper document, the user is promoted to affix the stamp to only this set are. In this case, in step S4, the shape analyzing unit 122 confirms whether a stamp image exists or not with reference to only the preset area. Alternatively, since it is considered that a user generally affixes a stamp to a blank space on a paper document at which no document content is printed, an area having relatively many white-color pixels may be first extracted as a blank space in the document image data, and the area in the blank space at which the similarity with the feature amount of the stamp image in the stamp table is equal to or more than a threshold value may be extracted as a stamp image in the document image data.

When the stamp image fails to be extracted (NO in step S6), the policy server 10 does not execute the processing of the step S8 and subsequent steps, and finishes the processing. At this time, the policy server 10 may store the document image data in a preset storage device (not shown) or a server designated by the user as a storage place of the documents to which no policy is appended.

When the stamp image succeeds to be extracted (YES in step S6), the number analyzing unit 124 in the stamp analyzing unit 120 specifies the number of extracted stamp images (step S8).

Figure 5B:
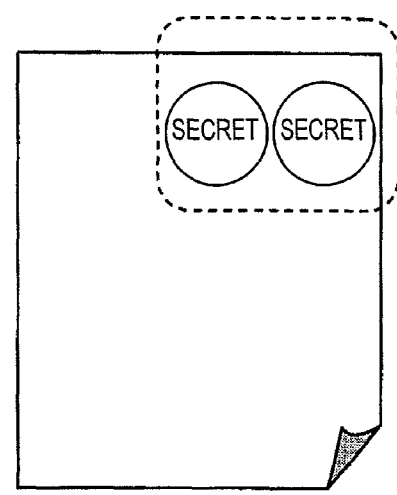

Subsequently, the policy determining unit 132 refers to the policy DB 100 to specify the policy corresponding to the extracted stamp images and the number of the stamp images (step S10). For example, the policy ID of the policy corresponding to the extracted stamp image and the number of the stamp images may be obtained from the policy DB 100. As one specific example, when the document image data of the paper document in FIG. 5B is a processing target, two stamp images in the stamp table in FIG. 4 are extracted. In this case, the policy determining unit 132 first obtains from the stamp table the security level of "FOR DIVISION USE ONLY" in correspondence with the number of the stamps "2". The policy determining unit 132 then refers to the policy table in FIG. 3, and obtains the policy ID of "policy2" which is the policy of the security level "FOR DIVISION USE ONLY".

The protected document generating unit 134 generates a protected document to which the policy of the policy ID obtained by the policy determining unit 132 in step S10 is appended (step S12). The protected document generating unit 134, for example, generates identification information of the electronic document concerned and also encrypts the document image data as the processing target. Then, the electronic document containing the policy ID obtained by the policy determining unit 132, the identification information of the generated electronic document, and the encrypted data of the document image data as the processing target is set as the protected document. Furthermore, the protected document generating unit 134 may make the image processing device 20 of a transmission source for transmitting the document image data as the processing target generate a paper document on which the protected document (electronic document) generated in step S12 is printed. In this case, for example, the protected document generating unit 134 informs the image processing device 20 of the identification information of the protected document, and the image processing device 20 informed of the identification information generates a paper document on which a code (for example, a machine-readable code such as a bar code or a QR code) representing the identification information of the protected document is printed together with the document image data as the processing target.

The protected document registering unit 136 registers the protected document generated in step S12 to the document DB 110 (step S14), and then finishes the processing of the steps in FIG. 6.

According to the above exemplary embodiment, a different policy is appended to an electronic document generated by scanning a paper document in accordance with how many stamps of one type are affixed to the paper document. In another exemplary embodiment, a policy may be determined in accordance with which type of stamps and how many stamps are affixed to the paper document among plural different types of stamps. In other words, a plurality of different stamp images are registered in the stamp table. FIGS. 7 and 8 show examples of the contents of the policy table and the stamp table according to this exemplary embodiment.

In the policy table shown in FIG. 7 are the items of policy ID, stamp ID, usage term, usage range and permitted operation. Definition of each item of the policy ID, the usage term, the usage range and the permitted operation is the same as the policy table described with reference to FIG. 3. In FIG. 7, the stamp ID is registered in place of the security level in FIG. 3. The stamp ID is identification information appended to each pair of a stamp image and the number of stamps. The values of the usage range and the permitted operation in each policy are not registered in the policy table in FIG. 7, but information representing that the stamp table should be referred to is registered.

In the stamp table in FIG. 8 are registered the items of the stamp image, the number of stamps, the stamp ID, the usage range and the permitted operation. In FIG. 8, two different stamp images of "IMPORTANT" and "CONFIDENTIAL" are registered as stamp images, and each stamp ID is registered in association with the pair of the stamp image and the number of stamps. The contents of the usage range and the permitted operation in the policy corresponding to each stamp ID are registered in the respective items of the usage range and the permitted operation.

In the examples of FIGS. 7 and 8, with respect to the items (usage term, usage range and permitted operation) defining the content of the policy corresponding to each stamp ID, the value of the item (usage term) whose content does not vary in the case of the same stamp image even when the number of stamp images is different is registered in the policy table. The items (usage range and permitted operation) whose contents vary even in the case of the same stamp image when the number of stamp images is different are registered in the stamp table.

In this exemplary embodiment, the contents of the policies corresponding to the pairs containing the same stamp images out of the pairs of the stamp image and the number of stamps are set to limit the usage of the protected document more strictly as the number of stamps is larger. For example, referring to the usage range and the permitted operation of the policy corresponding to the stamp image of "IMPORTANT" in FIG. 8, with regard to the permitted operation of "Inspection/Edit", "D group" in the usage range corresponding to the stamp ID "stamp 2" whose number of stamps is "2" has a smaller number of affiliated users than "Division A" in the usage range corresponding to the stamp ID "stamp 1" whose number of stamps is "1". With regard to "Division A" in the usage range, the permitted operation of "Inspection/Print" corresponding to the stamp ID "stamp 2" is less in the number of permitted operations than the permitted operation "Inspection/Edit/Print" corresponding to the stamp ID "stamp 1".

When the policy DB 100 is provided with the policy table and the stamp table each exemplified in FIGS. 7 and 8, the processing of the procedure in FIG. 6 may be performed in the same manner as described above in the policy server 10. In this case, the policy determining unit 132 may obtain from the stamp table the stamp ID corresponding to the stamp image and the number of the stamp images to obtain the policy ID corresponding to the stamp ID from the policy table in step S10 of FIG. 6.

A specific example of the step S10 in FIG. 6 when the policy DB 100 has the policy table and the stamp table shown in FIGS. 7 and 8 will be described with reference to FIG. 9. A paper document to which one stamp of "CONFIDENTIAL" is affixed (FIG. 9A) has one stamp image of "CONFIDENTIAL" affixed thereto. Accordingly, when the document image data of the paper document in FIG. 9A is a processing target in the processing of the procedure of FIG. 6, the policy determining unit 132 obtains from the stamp table the stamp ID "stamp3" corresponding to the pair of the stamp image "CONFIDENTIAL" and the number of stamps "1" (see FIG. 8), and obtains from the policy table the policy ID "policy3" corresponding to the stamp ID "stamp3" (see FIG. 7), in the step S10. In addition, when a processing target is document image data obtained by scanning a paper document having two "CONFIDENTIAL" stamps (FIG. 9B), the policy determining unit 132 obtains from the stamp table the stamp ID "stamp4" corresponding to the pair of the stamp image "CONFIDENTIAL" and the number of stamps "2" (see FIG. 8), and obtains from the policy table the policy ID "policy4" corresponding to the stamp ID "stamp4" (see FIG. 7), in step S10.

Figures 11, 12:
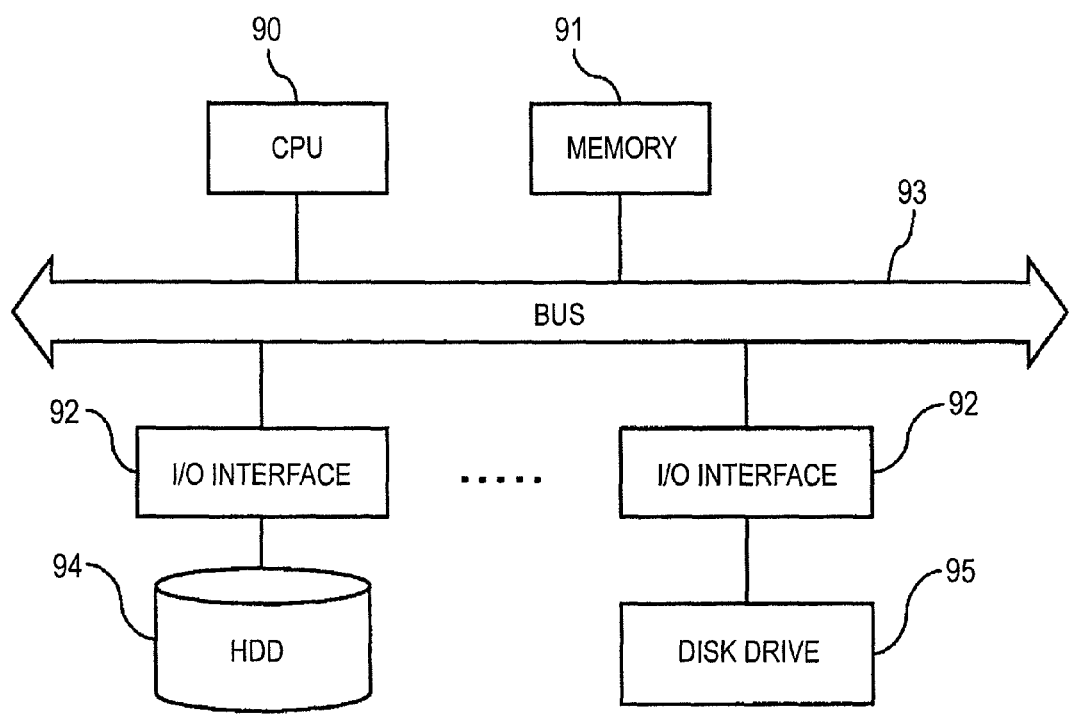
FIG. 11 shows a further example of contents of the stamp table.
FIG. 12 shows an example of the construction of the hardware of a computer.

Another example of each of the policy table and the stamp table is shown in FIGS. 10 and 11. FIGS. 10 and 11 show examples when a usage term out of the items defining contents of a policy, varies depending on the number of stamp images.

As in the case of the policy table of FIG. 7, the policy table in FIG. 10 includes the items of a policy ID, a stamp ID, usage range, permitted operation, and usage term. Here, actual values are not registered in the item of the usage term, but information indicating that the stamp table should be referred to is registered.

The stamp table in FIG. 11 includes the item of a stamp image, the number of stamps, a stamp ID, and usage term. Each item of the stamp image, the number of stamps, and the stamp ID is the same as the stamp table in FIG. 8. The value of the usage term out of the content of the policy corresponding to each stamp ID is registered in the stamp table in FIG. 11. In FIG. 11, the usage term of the policy corresponding to the pairs containing the same stamp images out of the pairs containing the stamp image and the number of stamps is set to be shorter as the number of stamps is larger.

As described with reference to FIGS. 7 to 11, in a case where the value of the item defining the content of the policy is dispersively registered in the policy table and the stamp table, the document usage managing unit 140 specifies the content of the policy appended to the protected document by referring to both of the policy table and the stamp table when the document usage managing unit 140 limits usage of the protected document. It means that the policy content of the policy ID is specified by combining a part of the content of the policy registered in the policy table in correspondence with the policy ID contained in the protected document and the remaining part of the content of the policy registered in the stamp table in correspondence with the stamp ID corresponding to the policy ID.

In the example described above with reference to FIGS. 7 to 11, with regard to the items of the contents of the policy registered in the stamp table, the information indicating that the stamp table should be referred to is registered in the policy table. However, in the processing of the document usage managing unit 140, the item of the content of the policy registered in the stamp table may not be registered in the policy table as long as both of the policy table and the stamp table are referred to as described above.

In addition, in the example of the exemplary embodiment in which a plurality of stamp images are registered in the stamp table, the item defining the content of the policy may not be necessarily registered in the policy table and the stamp table dispersively in contrast to the example described above with reference to FIGS. 7 to 11. In the same manner as the policy table and the stamp table in FIGS. 3 to 4, all the values of the items defining contents of the policies may be registered in the policy table.

In each example as described above, a policy of limiting usage of a protected document more strictly is appended to a document as the number of stamps is larger. In another example, on the contrary, a policy of limiting usage of a protected document more strictly may be appended to a document as the number of stamps is smaller. In other words, limitation of usage of a protected document may be set to be looser as the number of stamps is larger. For example, the content of a policy is set to correspond to at least one of the followings: (i) usage term is longer; (ii) the number of users in the usage range corresponding to the same permitted operation is larger, and (iii) the number of kinds of permitted operations corresponding to the same usage range is larger, as the number of stamps is larger.

An example of affixing a stamp to append a mark (stamp image) onto a paper document is described above. However, a method of appending a mark on a paper document is not limited to the affixing of a stamp. For example, a mark similar to the mark of a stamp may be printed on a paper document. The paper document on which a mark is printed may be subject to various processing as described above in the same manner.

Instead of registering the stamp image in the stamp table, character string contained in the stamped mark (e.g., "SECRET", "CONFIDENTIAL", "IMPORTANT", and the like) may be registered as the information for recognizing the stamped mark. When the character string is registered in the stamp table, in the step S4 in FIG. 6 which is executed by the policy server 10, the shape analyzing unit 122 in the stamp analyzing unit 120 extracts the character string registered in the stamp table from the document image data using, for example, the OCR (optical character recognition) technique.

Specific styles of the policy table and the stamp table are not limited to the various examples described as above. For example, the items defining the contents of the policy in the policy table may further contain items other than the usage range, the permitted operation and the usage term. They may contain setting of processing executed when some kind of operation is executed, such as "overlay-print of a mark preset when printing is executed", for example. Furthermore, instead of or in addition to the permitted operation, types of prohibited operations (prohibited operation) may be registered with regard to users or groups indicated in the corresponding usage range. A policy of limiting usage of a protected document "more strictly" with regard to the prohibited operation, is a policy corresponding to at least one of the policy that the kinds of the prohibited operations corresponding to the same usage range are abundant and the policy that the number of users in the usage range corresponding to the same prohibited operation is large. In contrast, to limit usage of a protected document "more loosely" with regard to the prohibited operation means to correspond to at least one of the policy that the kinds of the prohibited operations corresponding to the same usage range are shorter and the policy that the number of users in the usage range corresponding to the same prohibited operation is smaller.

The contents of the above policy table and stamp table may be unified into one table and registered in the policy DB 100. In the policy DB 100, it may be enough to register the information to specify the content of the corresponding policy as long as the pair of the stamp image and the number of stamps is specified.

The policy server 10 in the various exemplary embodiments described above is generally achieved by executing a program in which function of each unit in the policy server 10 or the content of the processing is described by using a general-purpose computer. As shown in FIG. 12, the computer has, as hardware, a circuit construction in which CPU (Central Processing Unit) 90, a memory (primary storage) 91, various kinds of I/O (input/output) interfaces 92, etc. are connected to one another through a bus 93, for example. In addition, a disk drive 95 for reading portable non-volatile recording media having various specifications such as an HDD (Hard Disk Drive) 94, a CD, a DVD, or a flash memory through the I/O interface 92, for example is connected to the bus 93. The drive 94 or 95 functions as an external storage device to the memory. The program in which the content of the processing of the exemplary embodiments are described is stored into a read-only memory such as the HDD 94 through a recording medium such as CD or DVD or through a network, and then is installed in the computer. The program stored in the read-only memory is read out into the memory and executed by CPU, whereby the processing of the exemplary embodiments is implemented.

In the above exemplary embodiments, the policy server 10 is implemented by one computer. However, it may be achieved by dispersing the various functions of the policy server 10 as described above into a plurality of computers. Furthermore, the functions of the stamp analyzing unit 120 and the policy managing unit 130 out of the functions of the policy serer 10 described above may be implemented by the image processing device 20. In this case, the image processing device 20 refers to the policy DB 100 in the policy server 10 to execute the processing in the procedures as shown in FIG. 6 on the document image data obtained by scanning and reading the paper document.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
    a first storing unit that stores usage limitation information that indicates a usage limitation of a document, the usage limitation information including a stamp image that indicates a document is limited in use, and a corresponding number of the stamp images for the usage limitation;
    a second storing unit; and
    a registering unit that extracts one or more stamp images from document image information obtained by reading a paper document containing at least one stamp image, obtains usage limitation information corresponding to the extracted stamp image and a number of the extracted stamp images, from the first storing unit, and registers the obtained usage limitation information and the document containing the document image information in correlation with each other into the second storing unit,
    wherein the usage limitation of the document is more strict as the number of the stamp images of the usage limitation increases.

2. The information processing apparatus according to claim 1, wherein the usage limitation information contains information for correlating an operation subject executing an operation on a document with a type of an operation which the operation subject is permitted to execute or prohibited from executing, and wherein
    usage limitation having a larger number of the stamp images corresponds to at least one of a status that a number of types of the permitted operations of the usage limitation is smaller, a status that the number of types of the prohibited operations of the usage limitation is larger, a status that a number of the operation subjects correlated with the types of the permitted operations is smaller, and a status that the number of the operation subjects correlated with the types of the prohibited operations is larger, in comparison with a usage limitation having a smaller number of the stamp images.

3. The information processing apparatus according to claim 1, wherein the usage limitation information contains information which indicates a usage term of a document, and the usage limitation having a larger number of the stamp images includes a shorter usage term in comparison with the usage limitation having a smaller number of the stamp images.

4. The information processing apparatus according to claim 2, wherein the usage limitation information contains information which indicates a usage term of a document, and the usage limitation having a larger number of the stamp images includes a shorter usage term in comparison with the usage limitation having a smaller number of the stamp images.

5. An information processing apparatus, comprising:
    a first storing unit that stores usage limitation information that indicates a usage limitation of a document, the usage limitation information including a stamp image that indicates a document is limited in use, and a corresponding number of the stamp images for the usage limitation;
    a second storing unit; and
    a registering unit that extracts one or more stamp images from document image information obtained by reading a paper document containing at least one stamp image, obtains usage limitation information corresponding to the extracted stamp image and a number of the extracted stamp images, from the first storing unit, and registers the obtained usage limitation information and the document containing the document image information in correlation with each other into the second storing unit,
    wherein a usage limitation of a document is more loose as the number of the stamp images of the usage limitation increases.

6. The information processing apparatus according to claim 5, wherein the usage limitation information contains information for correlating an operation subject executing an operation on a document with a type of an operation which the operation subject is performed to execute or prohibited from executing, and
    a usage limitation having a larger number of the stamp images corresponds to at least one of a status that a number of types of the permitted operations of the usage limitation is larger, a status that the number of types of the prohibited operations of the usage limitation is smaller, a status that a number of the operation subjects correlated with the types of the permitted operations is larger, and a status that the number of the operation subjects correlated with the types of the prohibited operations is smaller, in comparison with a usage limitation having a smaller number of the stamp images.

7. The information processing apparatus according to claim 5, wherein the usage limitation information contains information indicating a usage term of a document, and a usage limitation having a larger number of the stamp images includes a longer usage term in comparison with a usage limitation having a smaller number of the stamp images.

8. The information processing apparatus according to claim 6, wherein the usage limitation information contains information indicating a usage term of a document, and a usage limitation having a larger number of the stamp images includes a longer usage term in comparison with a usage limitation having a smaller number of the stamp images.

9. A non-transitory computer readable medium storing a program causing a computer capable of referring to a first storage that stores usage limitation information that indicates a usage limitation of a document, the usage limitation information including a stamp image that indicates a document is limited in use, and a corresponding number of the stamp images for the usage limitation, and a second storage that stores the usage limitation and a document whose use is limited according to the usage limitation, in correlation with each other, to execute a process for processing information, the process comprising:
    extracting one or more stamp images from document image information obtained by reading a paper document containing at least stamp image;
    obtaining usage limitation information corresponding to the extracted stamp image and a number of the extracted stamp images, from the first storing unit; and
    registering the obtained usage limitation information and the document containing the document image information in correlation with each other into the second storing unit, wherein the usage limitation of the document is more strict as the number of the stamp images of the usage limitation increases.

10. A non-transitory computer readable medium storing a program causing a computer capable of referring to a first storage that stores usage limitation information that indicates a usage limitation of a document, the usage limitation information including a stamp image that indicates a document is limited in use, and a corresponding number of the stamp images for the usage limitation, and a second storage that stores a usage limitation and a document whose use is limited according to the usage limitation, in correlation with each other, to execute a process for processing information, the process comprising:
   extracting one or more stamp images from document image information obtained by reading a paper document containing at least stamp image;
   obtaining usage limitation information corresponding to the extracted stamp image and a number of the extracted stamp images from the first storing unit; and
   registering the obtained usage limitation information and the document containing the document image information in correlation with each other into the second storing unit,
   wherein a usage limitation of a document is more loose as the number of the stamp images of the usage limitation increases.

11. An information processing apparatus, comprising:

a policy database that stores a plurality of usage limitation policies, each usage limitation policy including a stamp image that indicates a document is limited in use, and a corresponding number of the stamp images for the usage limitation policy;

a document database; and a processor that refers to the policy database, extracts one or more stamp images from document image information obtained by reading a paper document containing at least one stamp image, determines a number of the stamp images included in the document image information, obtains the usage limitation policy corresponding to the extracted stamp image and the determined number of the stamp images from the policy database, and registers the obtained usage limitation policy and the document containing the document image information in correlation with each other into the document database, wherein a usage limitation policy of the plurality of usage limitation policies that includes a larger number of stamp images indicates a usage limit of the document that is more strict than a usage limitation policy that includes a smaller number of stamp images.

* * * * *